United States Patent [19]

Thelander

[11] 4,072,605

[45] Feb. 7, 1978

[54] METHOD OF OBTAINING A PRECIPITATE OF METALLIC IONS FROM SOLUTIONS CONTAINING LOW CONCENTRATIONS OF METAL SALTS

[75] Inventor: Paul F. Thelander, Minneapolis, Minn.

[73] Assignee: Automated Medical Systems, Inc., Minneapolis, Minn.

[21] Appl. No.: 690,035

[22] Filed: May 25, 1976

Related U.S. Application Data

[63] Continuation-in-part of Ser. No. 635,910, Nov. 28, 1975, abandoned.

[51] Int. Cl.² ............................................. B01D 21/01
[52] U.S. Cl. ...................................... 210/50; 210/62; 423/22; 423/34
[58] Field of Search ...................... 75/108; 210/50, 62; 423/11, 22, 34, 35, 42, 43, 50, 51, 55, 65, 92, 94, 101, 102, 103, 104, 126, 127, 140, 475, 492

[56] References Cited

U.S. PATENT DOCUMENTS

| | | | |
|---|---|---|---|
| 2,206,889 | 7/1940 | Gulbrandsen | 423/42 |
| 2,828,184 | 3/1958 | Behrman | 423/475 |
| 3,288,708 | 11/1966 | Cordle et al. | 210/62 |
| 3,542,507 | 11/1970 | Ross | 423/92 |
| 3,575,854 | 4/1971 | Richards | 210/50 |
| 3,819,051 | 6/1974 | Henley et al. | 210/50 |
| 3,926,802 | 12/1975 | Hedgpeth | 210/62 |

Primary Examiner—Wilbur L. Bascomb, Jr.
Assistant Examiner—Robert H. Spitzer
Attorney, Agent, or Firm—Orrin M. Haugen

[57] ABSTRACT

A method and process for removal by precipitation of salts of a variety of metallic elements from aqueous solutions, including for example, copper, cadmium, chromium, zinc, nickel, lead, tin, platinum, rhodium and others with each of the metallic elements having multiple valent states. The process includes the establishment of a simultaneous oxidative-reductive cycle within the aqueous solutions, with the oxidative-reductive cycle normally being generated through the use of iodine, normally in the form of the iodide or iodate and phosphorous acid. In certain reactions, it is desirable that the pH be controlled and in such solutions, the phosphorous acid may be added in the form of a sodium salt of phosphorous acid. In the utilization of the multivalent materials, the least soluble salt generated during the oxidative-reductive cycle is removed.

7 Claims, No Drawings

METHOD OF OBTAINING A PRECIPITATE OF METALLIC IONS FROM SOLUTIONS CONTAINING LOW CONCENTRATIONS OF METAL SALTS

CROSS-REFERENCE TO RELATED APPLICATION

This is a Continuation-in-Part application of co-pending application Ser. No. 635,910, filed Nov. 28, 1975, entitled "METHOD OF OBTAINING A PRECIPITATE OF METALLIC IONS FROM SOLUTIONS CONTAINING LOW CONCENTRATIONS OF METAL SALTS" now abandoned.

BACKGROUND OF THE INVENTION

The present invention relates generally to a method and process for removing certain metallic ions from aqueous solutions, and more specifically to a process for the removal of such metals as copper, chromium, zinc, cadmium, nickel, platinum, antimony, iron, manganese, aluminum, thorium, tin, mercury, vanadium, rhodium and silver from aqueous solutions containing modest quantities or concentrations of these metals. Such aqueous solutions are frequently encountered in chemical processing operations, such as in plating baths, etching baths and the like, and because of disposal problems, the various aqueous solutions must be treated for removal of these metals prior to discharge into normal industrial sewage systems or the like. Also, in certain cases, the metal may have significant intrinsic value, and such materials are recovered primarily for their value.

Because of certain characteristics, a number of metals are deemed a highly undesirable element to have present in solutions destined for sewage systems. Most such systems function in a form where the presence of even minute quantities of dissolved heavy metals can disrupt the effective utilization of the sewage treatment facility. Copper is recognized as being particularly bad. This problem, as well as certain other problems are also encountered in connection with aqueous solutions containing cadmium, chromium, zinc, nickel, tin or lead. The present invention provides a procedure wherein a substantial number of metals may be effectively removed from aqueous solutions prior to their being discharged into treatment facilities. This process has application to other industries such as precious metal plating and recovery, silver recovery from photographic developer solutions and the like.

SUMMARY OF THE INVENTION

Briefly, in accordance with the present invention, aqueous solutions containing low to moderate concentrations of metallic ions selected from certain groups of the Periodic Table and in many cases these metal ions are considered representative of chemical behavior for the other elements in the group and including elements from Groups Ib, IIb, III, IV, V, VI, VII, VIII, rare earths of Actinide Series and including, for example, copper, cadmium, chromium, zinc, nickel, tin, or platinum, are treated to generate a simultaneous oxidative-reductive cycle within the solution. In order to initiate the oxidative-reductive cycle, phosphorous in the form of phosphorous acid or a sodium salt thereof in combination with iodine in a water soluble form such as the iodide, iodate, or iodine is added to the aqueous solution. The pH of the solution is controlled, and normally maintained on the acid side. pH control may be obtained through the use of either sodium or potassium hydroxide, or any other alkaline anion with which the particular metal salt involved forms an insoluble compound. For copper, for example, during the oxidative-reductive cycle, an insoluble precipitate is formed, with the precipitate normally being the salt of the least soluble salt, which occurs during the spontaneous oxidative-reductive cycle. In treating copper containing solutions, an aqueous soluble iodide is useful, while for treating solutions containing cadmium, chromium, zinc, nickel, tin or lead, a stronger agent such as the iodate in the presence of calcium oxide or other oxides is preferred. In these cases, the precipitate is normally the oxide of the metals, according to X-ray diffraction along with other possible precipitates.

In the treatment of certain solutions, it is desirable to control the pH to a desired level. In some cases, the pH is selected to be closer to neutrality such as in the area of 5 with this level reducing the concentration of free iodine in the solution.

Therefore, for possible indications of the various areas in which the invention may be applied, reference is made to treatment of plating baths and rinse solutions, treatment of effluent from printed circuit board manufacture, treatment of effluent and other residue from paint manufacturing processes, treatment of food processing materials including fats, oils and greases utilized in processing, treatment of petroleum refining residue, treatment of storage battery manufacturing solutions, treatment of organic dies utilized for anodizing operations, treatment of heat treating baths and processes thereof, treatment of galvanized plant processing materials, treatment of residue from drug manufacturing processes utilizing metallic ions, treatment of wastes from insecticide manufacturing utilizing metallic ions, treatment of agricultural chemicals using metals in their processing, treatment of animal feeds in their processing, and treatment of waste in copper and nickel processing. In these various applications, the recovery of metal salts may be employed for re-cycling where economically feasible, including re-use by the processor or re-constitution of the component by a supplier including the possible recovery from wet-process scrubbers used in air pollution control.

Therefore, it is a primary object of the present invention to provide an improved method for precipitation of heavy metals from aqueous solutions, specifically solutions containing metallic ions selected from the Groups Ib, IIb, IIIa, IV, V, VI, VII, VIII, and rare earth Actinide Series and including copper, cadmium, chromium, zinc, nickel, tin, platinum, rhodium and others, wherein the procedure involves the generation of an oxidative-reductive cycle within the solution so as to form in the presence of suitable anion an insoluble precipitate which may be appropriately removed from the solution.

It is a further object of the present invention to provide an improved method of removal of certain metallic ions from aqueous solutions, the method comprising the introduction of iodine and phosphorous acid into an aqueous solution in order to spontaneously provide a simultaneous oxidative-reductive cycle within the solution to enable removal of a precipitate of the least soluble cation-anion combination formed by the metallic ion during the oxidative-reductive cycle.

Other and further objects of the present invention will become apparent to those skilled in the art upon a review of the following specification and appended claims.

DESCRIPTION OF THE PREFERRED EMBODIMENT

In order to disclose the various aspects of the present invention, the following specific examples are provided:

GENERAL EXAMPLE

Generally speaking, an aqueous solution containing the metallic salt or inorganic compound desirable for removal is treated with phosphorous acid, iodine in the form of the iodide or the iodate, or iodine, and one or more of the following:

Sodium or potassium hydroxide;
Calcium oxide;
A suitable anion that, in combination with a proper valence state of the metal, will combine to form an insoluble salt. In some instances, the solution may be heated.

A spontaneous oxidative-reductive cycle occurs leading to the precipitation of the metal in the form of a salt. It is believed that the following simultaneous reactions are occurring:

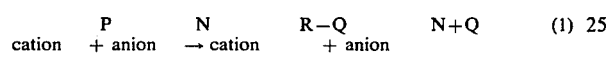
(1)

wherein:
P represents a positive valence;
N represents a negative valence;
Q represents a reduced or oxidized valence.

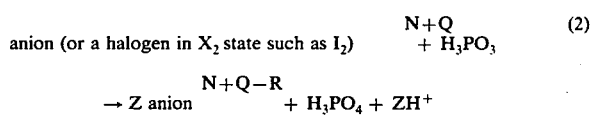
(2)

"R" represents the new valence state.

The reaction is enhanced and/or stabilized by sodium hydroxide to form the conjugated base of phosphorous acid as follows:

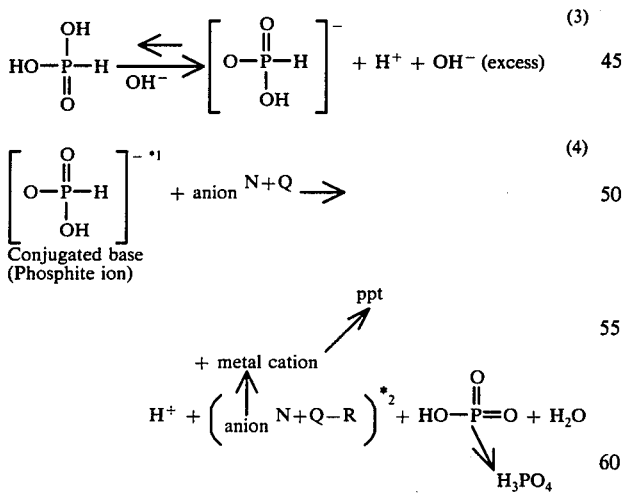

The phosphorous atom in the above conjugated base when activated through control of the pH in aqueous solution forms a proposed intermediate hydride ion which has two free electrons to supply to the oxidative-reductive process. The anion may be any number of suitable ions which are susceptible of being reduced.

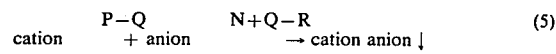
(5)

EXAMPLE 1

An aqueous solution containing copper in the cupric state at a concentration of 0.1 M or less was treated with the addition of a molar excess of iodine and phosphorous acid. Sodium hydroxide was added in order to speed the reaction and decrease the apparent free iodine. A spontaneous oxidative-reductive cycle occurred leading to the precipitation of cuprous iodide. It is believed that the following simultaneous reactions are occurring:

(6)

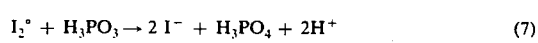
(7)

Enhanced or stabilized by NaOH

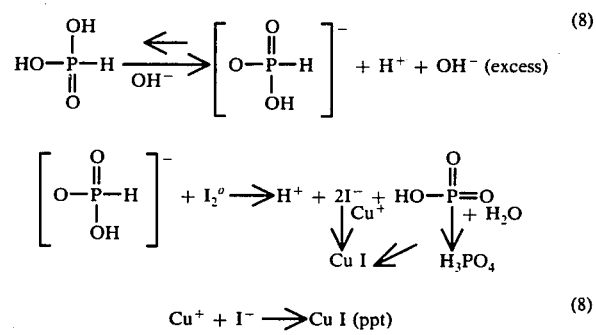

$$Cu^+ + I^- \longrightarrow Cu\,I\,(ppt) \tag{8}$$

This phosphorous atom in the above conjugated base form has two free elections transferred by means of a proposed hydride ion which is activated by pH control in aqueous solutions. These electrons are the means by which the oxidative-reductive cycle is provided with available electrons. In certain circumstances, ions other than those formed with iodine and which are susceptible to being reduced may be utilized. For example, silver thiosulfate, rhodium sulfate or the like may be considered. The reaction was effective for the removal of copper from the solution with the only copper remaining being that beneath the solubility limit of cuprous iodide in the solution.

EXAMPLE 2

A 0.1 M solution of potassium dichromate was treated with a solution of 0.4 M phosphoric acid, 0.15 M potassium iodide, and 1 gram of calcium oxide. After a period of time, a substantial quantity of emerald green precipitate occurred, with the precipitate being believed to be chromic oxide according to X-ray diffraction results. The reactions occurring are believed to be substantially identical to those occurring in the copper-containing solution described above, with the solution differences being that of a substitution of chromium for copper and the oxide for iodide.

The function of the calcium oxide is that of enhancing the formation of the metal oxide of chromium. It is believed that the calcium oxide accelerates the reaction.

The reaction which appeared to be complexing to form a coordinate metal oxide, was effective to remove substantially all of the chromium present in the potassium dichromate solution.

EXAMPLE 3

A 0.1 M solution of zinc chloride was treated with 0.4 M phosphorous acid, 0.15 M potassium iodide, along with 2 grams of calcium oxide. Thereafter, a slight excess of potassium iodate was added and a spontaneous precipitation occurred. It was found that an increase in the pH to a level of between 5 and 6 was effective in removing a heavyweight precipitate, with a 50% solution of sodium hydroxide being employed. The method was effective in removal of zinc from the solution, the resultant precipitate being zinc oxide according to X-ray diffraction data.

EXAMPLE 4

A 0.1 M solution of cadmium nitrate was treated with 0.4 M phosphorous acid, 0.15 M potassium iodide, 2 grams of calcium oxide for each 100 ml of solution, with the phosphorous acid and potassium iodide being added in molar excess to the cadmium present. Thereafter, a 0.05 M portion of potassium iodate was added in a molar excess, and an immediate reaction occurred forming precipitates along with a bright red solution of iodine. The system is believed to react substantially similarly to the reactions given in Example 1 above, with the iodate being the mechanism to accelerate the oxide formation.

EXAMPLE 5

A 0.1 M solution of nickel sulfate was treated with solutions of 0.4 M phosphorous acid, 0.15 M potassium iodide, and 2 grams of calcium oxide for each 100 ml of solution. Thereafter, with a molar excess of phosphorous acid and potassium iodide being present, an additional molar excess of a weight of 0.05 M potassium iodate was added forming an immediate precipitate. A bright red solution of iodine also occurred. The system was effective in removal of nickel from the solution, with the oxide of nickel being formed according to X-ray diffraction data.

EXAMPLE 6

A 0.1 M solution of potassium chloro-platinate was treated with solutions of 0.4 M phosphorous acid and a molar excess of 0.05 M potassium iodate. This system was effective in removal of platinum from the solution.

EXAMPLE 7

A 0.1 M solution of antimony trichloride was treated with 0.4 M phosphorous acid and 0.05 M potassium iodate (excess) and sodium hydroxide. The pH was 2 through the addition of the hydroxide. The system was effective in removal of antimony from the solution.

EXAMPLE 8

A 0.1 M solution of ferric nitrate was treated with 0.4 M phosphorous acid and 0.05 M potassium iodate and sodium hydroxide until the pH was raised to 5. The iodate was present in molar excess. The system was effective in removal of iron from the solution.

EXAMPLE 9

A 0.1 M solution of ferrous ammonium sulfate was treated with 0.4 M phosphorous acid and a molar excess of potassium iodate (0.05 M). The system was effective in removal of iron from the solution.

EXAMPLE 10

A 0.1 M solution of potassium ferricyanide was treated with phosphorous acid and a molar excess of potassium iodate forming a precipitate. The system was effective in removal of iron from the solution.

EXAMPLE 11

A 0.1 M solution of manganous sulfate was treated with phosphorous acid, 0.05 M potassium iodate (molar excess) and potassium hydroxide. A precipitate formed immediately, the system being effective in removal of manganese from the solution.

EXAMPLE 12

A 0.1 M solution of aluminum sulfate was treated with phosphorous acid, a molar excess of potassium iodate (0.05 M) and potassium hydroxide. The pH was 1. A precipitate formed and the system was effective in removal of aluminum from the solution.

EXAMPLE 13

A 0.1 M solution of thorium nitrate was treated with phosphorous acid, a molar excess of potassium iodate (0.05 M) and an immediate precipitate formed. The system was effective in removal of thorium from the solution.

EXAMPLE 14

A 0.1 M solution of stannous chloride was treated with phosphorous acid, a molar excess of potassium iodate (0.05 M), 2 grams of calcium oxide, and sodium hydroxide. An immediate precipitate formed which was effective in removal of tin from the solution.

EXAMPLE 15

A 0.1 M solution of mercuric nitrate was treated with phosphorous acid, a molar excess of potassium iodate (0.05 M). The system was effective in removal of mercury from the solution.

EXAMPLE 16

A 0.1 M solution of sodium vanadate was treated with phosphorous acid, a molar excess of potassium iodate (0.05 M) along with a sufficient quantity of potassium hydroxide to raise the pH to 5. A precipitate formed which was effective in removal of vanadium from the solution.

EXAMPLE 17

A 0.1 M solution of silver thiosulfate was treated with the addition of a molar excess of 0.4 M phosphorous acid and potassium iodate. The pH was adjusted to 3. The silver was removed from the solution through the precipitation of the probable oxide or iodate.

EXAMPLE 18

A 0.1 M solution of copper pyrophosphate was treated with phosphorous acid, potassium iodate or potassium iodide, each of 0.15 M concentration. Copper was removed from the solution through the precipitation of cuprous iodide.

EXAMPLE 19

Copper cyanide of 0.1 M concentration was treated with phosphorous acid and a molar excess of 0.05 M potassium iodate and 0.2 M potassium iodide. A spontaneous oxidation-reduction cycle occurred resulting in the precipitation of cuprous iodide and/or cuprous cyanide.

EXAMPLE 20

A rhodium sulfate solution was treated with phosphorous acid, potassium iodate, and brought up to a pH of 5.5 with sodium hydroxide. A precipitate was formed.

GENERAL DISCUSSION

In the case of zinc, as set forth in Example 3, the solution remains on the acid side even upon addition of sodium hydroxide thereto, in the amounts used. Zinc oxide appears to be forming, with the exact mechanism not being entirely understood. It appears that zinc may exist in both the oxidation states of $+1$ and $+2$ with the material being rendered adapted to the formation of oxides according to X-ray diffraction data.

In the case of chromium, as set forth in Example 2, it is believed that the calcium oxide with the iodine enhances the oxidation to further aid in the oxide formation. It is proposed that nickel and cadmium are in a transition state between oxidation states of $+1$ and $+2$, making each of them more susceptible to the combination with oxygen in the presence of the calcium oxide, and also to other oxygen which may be present in the system, such as may be possibly obtained from the reduction of iodate.

It is believed that the presence of phosphorous acid and an iodide ion either from potassium iodide, potassium iodate or iodine bring the metal cations into an oxidative-reductive cycle. Normally, in the presence of suitable anion relevant metals are more insoluble than the iodide, and the more insoluble precipitate will, of course, be initiated. For example, in the case of Example 1 utilizing copper, the presence of a cyanide in the solution will cause the precipitation of cuprous cyanide as well as the cuprous iodide. From additional studies, cyanide appears to be decomposed in this reaction. Also, when chromium may be present in the oxidative-reductive cycle in the presence of a chloride ion, the highly insoluble chromic chloride forms a precipitate.

Whenever many of the metallic ions, for example, copper, chromium, zinc, cadmium, nickel, platinum, antimony, iron, manganese, aluminum, thorium, tin, mercury, vanadium, rhodium, or silver are present in an oxidative-reductive cycle, the precipitates which are formed are either the oxides or the metallic complexes of the relevant metal, and in the case of copper, the iodides and in some cases the metal and phosphates and iodates, some reactions occur directly. Specifically, copper, chromium, zinc, cadmium, nickel and tim precipitate in the presence of calcium oxide. It is believed that certain other oxides, particularly alkaline earth oxides may function in a similar fashion to the calcium oxide, calcium oxide being, of course, more readily available.

I claim:

1. The method of precipitating salts of metallic elements having multiple valent states and selected from the group consisting of copper, chromium, zinc, cadmium, nickel, lead, platinum, antimony, iron, manganese, aluminum, thorium, tin, mercury, vanadium, rhodium and silver from aqueous solutions of said metallic elements, said method comprising:
   a. introducing phosphorous acid and an excess of a halogen selected from the group consisting of iodine, iodide and iodate to said aqueous solution to form a simultaneous oxidative-reductive cycle within said aqueous solution involving said metallic element; and
   b. precipitating and removing the salt of the less soluble valence state of said metallic element from said aqueous solution.

2. The method as defined in claim 1 being particularly characterized in that said halogen is added to said solution as the iodide ion.

3. The method as defined in claim 1 being particularly characterized in that an alkali hydroxide is added to activate the reaction through controlling the reduction of free iodine and activates the free electrons of the phosphorous atom of said phosphorous acid in the conjugated base form by means of the proposed intermediate hydride ion which in turn, releases these electrons for reduction purposes.

4. The method as defined in claim 1 being particularly characterized in that said phosphorous acid is present as a phosphorous salt selected from the group consisting of hydrogen phosphite and sodium bi-hydrogen phosphite.

5. The method as defined in claim 1 being particularly characterized in that said halogen is present in said solution as a salt selected from the group consisting of soluble iodides, soluble iodates, or iodine.

6. The method as defined in claim 1 being particularly characterized in that the pH of said aqueous solution following introduction of said halogen and phosphorous acid is generally on the acid side of neutrality.

7. The method as defined in claim 1 being particularly characterized in that an alkaline earth oxide is added to enhance oxidative-reductive functions to form corresponding oxides of the metallic ions following the path of oxide formation.

* * * * *